P. A. McGURRIN.
WATER METER.
APPLICATION FILED DEC. 7, 1908.

923,992.

Patented June 8, 1909.
2 SHEETS—SHEET 1.

Witnesses
C. M. Fahnestock
A. McCormack

Inventor
Peter A. McGurrin
By Walter Murray
Attorney

P. A. McGURRIN.
WATER METER.
APPLICATION FILED DEC. 7, 1908.
923,992.
Patented June 8, 1909.
2 SHEETS—SHEET 2.
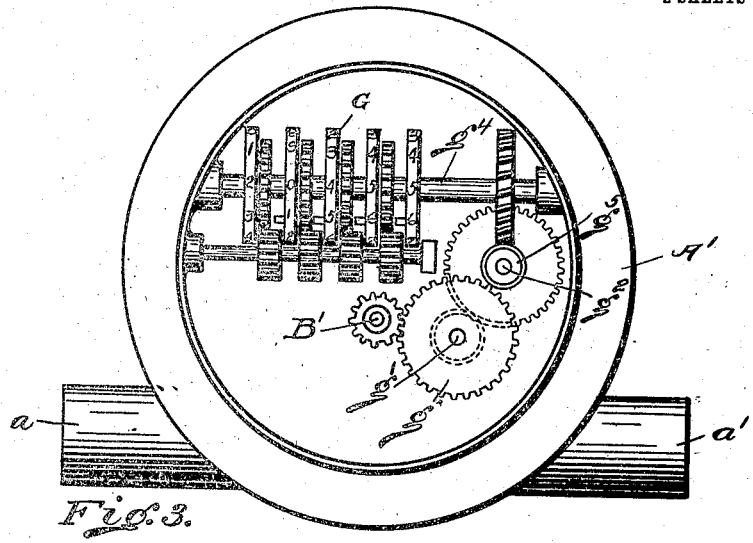
Fig. 3.
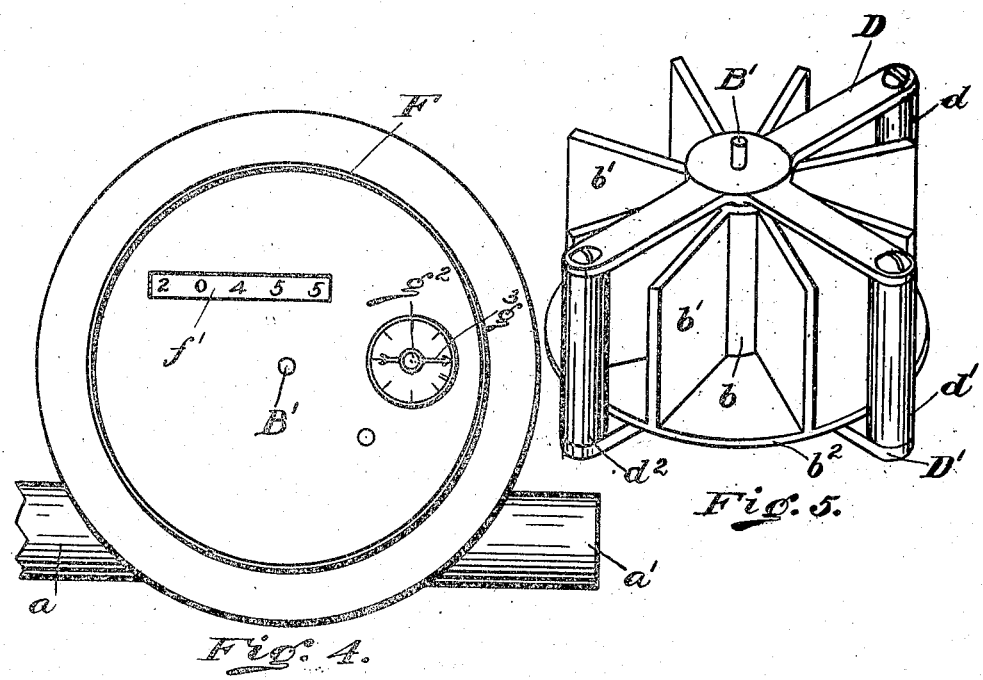
Fig. 4.
Fig. 5.
Witnesses
C. M. Palmester
A. McCormack.
Inventor
Peter A. McGurrin
By Walter F. Murray
Attorney

UNITED STATES PATENT OFFICE.

PETER A. McGURRIN, OF NORWOOD, OHIO, ASSIGNOR OF ONE-HALF TO WILLIAM C. WINANS, OF NORWOOD, OHIO.

WATER-METER.

No. 923,992.  Specification of Letters Patent.  Patented June 8, 1909.

Application filed December 7, 1908. Serial No. 466,213.

*To all whom it may concern:*

Be it known that I, PETER A. McGURRIN, a subject of the King of Great Britain, and resident of Norwood, county of Hamilton, State of Ohio, have invented certain new and useful Improvements in Water-Meters, of which the following is a specification.

My invention relates to water meters in which the revolutions of a wheel actuated by the water, register the amount of water which passes through the meter.

Figure 1:
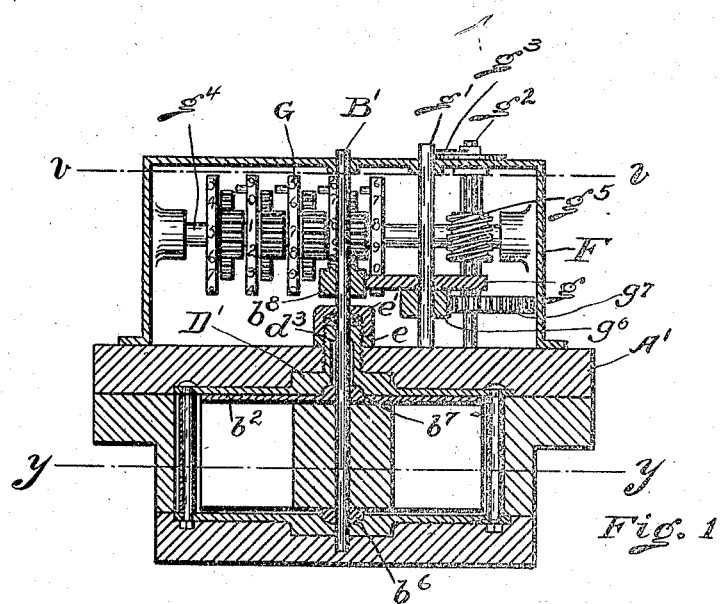
Figure 2:
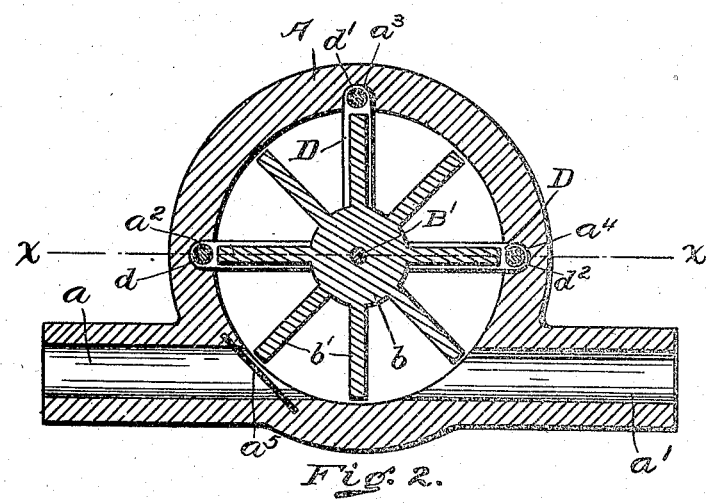

The object of my invention is a means of mounting the wheel in its case so as to prevent leakage therefrom, while not disturbing the sensitiveness of the instrument. This object is attained by the means described in the specification and illustrated in the accompanying drawings, in which, Figure 1 is a central sectional view of a water meter embodying my invention taken upon line $x$—$x$ of Fig. 2. Fig. 2 is a central view taken upon line $y$—$y$ of Fig. 1. Fig. 3 is a sectional view taken upon line $v$—$v$ of Fig. 1. Fig. 4 is a plan view of a meter. Fig. 5 is a perspective view of the wheel and its frame in an inverted position.

Referring to the parts: the case is in the form of a shallow cylinder, A, having adjacent to one side an admission port, $a$, and in alinement therewith an exit port, $a'$. Admission port, $a$, has a screen, $a^5$. In the walls of the cylinder there are three grooves, $a^2$, $a^3$, and $a^4$. The wheel consists of a hub, $b$, radiating paddles or wings, $b'$ and a disk, $b^2$, which is located at one end of the paddles and is preferably formed integral therewith. The wheel is of a diameter nearly equal to the internal diameter of the case, A. The wheel is mounted in a metallic frame which consists of two spiders, D, D', whose arms are held together by posts, $d$, $d'$ and $d^2$. The hubs of the spiders are perforated to pass the shaft, B' to which the wheel is secured.

Surrounding the perforations in the spiders annular recesses are made to form seats for annular collars, $b^6$ and $b^7$. Collar, $b^6$, projects from the underside of the hub, $b$, and collar, $b^7$, projects from the top of disk, $b^2$, into the seats formed in the spiders. In inserting the frame carrying the wheel into the case, the arms of the spiders and the posts, $d$, $d'$, and $d^2$, are seated in the grooves, $a^2$, $a^3$ and $a^4$, with the disk, $b^2$, uppermost. The spider, D', has an external and short cylindrical extension, $d^3$, which projects through the top, A', of the case and is engaged by the nut, $e$. By means of nut, $e$, the frame consisting of the two spiders, is drawn tight against the top, A'. The extension, $d^3$, is engaged likewise by a packing nut, $e'$. Housing, F, carrying a train of gears for registering the revolutions of the shaft, B', is seated upon the top, A'.

The means of coupling the shaft, B', to the train of gears is as follows:—Shaft B', carries a gear wheel, $b^8$, which meshes with a gear wheel $g$ secured upon the shaft, $g'$. The revolution of shaft, $g'$, is conveyed to a shaft, $g^2$, by intermeshing gear wheels $g^6$, $g^7$, in a manner such that one revolution of the shaft, $g^2$, is made for each cubic foot of water that passes through the meter, which is indicated by an index finger, $g^3$, secured upon the end of the shaft, $g^2$. The revolutions of the shaft $g^2$, are registered upon adding wheels, G, which are mounted upon a shaft, $g^4$, to which the revolutions of shaft, $g^2$, are conveyed by means of a worm, $g^5$. The numbers on the wheel, G, are read through a slot, $f'$, in the top of the case, F.

In operation the water passing through the casing, A, by pressing upward against the disk, $b^2$, holds the shoulder, $b^7$, in its seat with a pressure which is sufficient to prevent leakage between the shoulder and its seat. The tendency for the water to leak out increases with the increase of pressure in the case. The difficulty also of rotating the wheel increases with the pressure with which the shoulder, $b^7$, is held in its seat. The power of the water to rotate the wheel increases with its pressure. Therefore, where the pressure in the case, A, is small, the ease with which the wheel will move is greater because of the shoulder $b^7$, being held with less pressure in its seat, and where the pressure in the case is thus lessened there is a lessened tendency of the water to escape around the shoulder, $b^7$. By applicant's arrangement, therefore, the meter automatically adjusts itself to the demands made upon it.

What I claim is:

1. In a water meter the combination of a casing having a water channel therethrough and having a perforation in its top, a wheel in the casing and having adjacent to the top of the casing a disk, a shaft for the wheel projecting through the perforation in the casing, an annular shoulder upon the disk surrounding the shaft and adapted to contact with the top of the casing around the perforation, and radiating paddles projecting down from the disk, whereby the pressure of the water against the disk holds the shoulder against the top of the casing.

2. In a water meter the combination of a cylindrical case having grooves in its walls, a frame consisting of spiders connected by posts, a wheel journaled between the spiders, the spiders being seated in the case with the posts projecting into the grooves, the periphery of the wheel being adjacent to the walls of the case, a means of securing the upper spider against the top of the case, a shaft projecting through the spiders and the top of the case, a train of registering gears mounted upon the top of the case, and means of coupling the train to the shaft.

PETER A. McGURRIN.

Witnesses:
WALTER F. MURRAY,
WILL. C. WINANS.